United States Patent
Basu

[19]

[11] Patent Number: 5,883,706
[45] Date of Patent: Mar. 16, 1999

[54] MULTIPLEXER FOR LASER RANGING DEVICES AND THE LIKE

[75] Inventor: Santanu Basu, Rancho Palos Verdes, Calif.

[73] Assignee: Northrop Grumman Corporation, Los Angeles, Calif.

[21] Appl. No.: 760,547

[22] Filed: Dec. 5, 1996

[51] Int. Cl.$^6$ .............................. G01C 3/08; H01L 31/14
[52] U.S. Cl. ................... 356/4.01; 250/553; 356/5.01
[58] Field of Search .................................. 250/552, 553; 356/4.01–5.15

[56] References Cited

U.S. PATENT DOCUMENTS

| | | |
|---|---|---|
| 3,691,390 | 9/1972 | Chow et al. . |
| 3,751,166 | 8/1973 | Starkey et al. . |
| 3,875,534 | 4/1975 | Haven . |
| 4,227,261 | 10/1980 | Robertsson ............................ 455/600 |
| 4,427,880 | 1/1984 | Kanade et al. . |
| 4,834,531 | 5/1989 | Ward . |
| 4,902,126 | 2/1990 | Koechner . |
| 4,932,775 | 6/1990 | Wissman et al. . |
| 4,969,736 | 11/1990 | Slotwinski . |
| 5,013,151 | 5/1991 | Hughes . |
| 5,054,912 | 10/1991 | Kuchel ........................................ 356/5 |
| 5,062,150 | 10/1991 | Swanson et al. ....................... 359/152 |
| 5,065,455 | 11/1991 | Ito et al. ................................. 359/159 |
| 5,142,400 | 8/1992 | Solinsky ................................. 359/159 |
| 5,210,586 | 5/1993 | Grage et al. ............................... 356/5 |
| 5,231,401 | 7/1993 | Kaman et al. ............................ 342/55 |
| 5,231,480 | 7/1993 | Ulich ......................................... 358/95 |
| 5,532,813 | 7/1996 | Ohishi et al. ......................... 356/5.01 |

*Primary Examiner*—Stephen C. Buczinski
*Attorney, Agent, or Firm*—Terry J. Johnson; Karl J. Hoch, Jr.

[57] ABSTRACT

A multiplexer for laser range finders and the like has a plurality of laser transmitters disposed about the periphery thereof. Each of the laser transmitters transmits a beam which is substantially smaller than the return beam received by the laser receiver. The laser receiver and each of the laser transmitters are configured to have a substantially common optical axis such that laser beams transmitted by the laser transmitters substantially overlap at a plane of interest so as to provide enhanced illumination thereby.

8 Claims, 4 Drawing Sheets

MULTIPLEXER FOR LASER RANGING DEVICES AND THE LIKE

FIELD OF THE INVENTION

The present invention relates generally to laser range finders and more particularly to a multiplexer for laser range finders and the like.

BACKGROUND OF THE INVENTION

Laser range finders for determining the range to distant objects are well known. Such range finders find application in a variety of fields such as surveying, collision avoidance, and targeting.

Such laser range finders comprise a laser receiver and a coaxially mounted laser transmitter which is much smaller than the laser receiver. Such coaxial mounting of the laser receiver and laser transmitter results in operation of both devices along a common optical axis and thus both enhances the accuracy of the range finder and facilitates packaging thereof within a smaller volume. As those skilled in the art will appreciate, the farther away from the receiver that the transmitter is mounted, i.e., the more the devices deviate from having a common optical axis the less accurate the laser range finder tends to be.

It is generally desirable to package such laser range finders as efficiently as possible, since they are typically utilized upon vehicles, wherein space is typically at a premium. For example, in collision avoidance applications the laser range finder is typically disposed within an automobile or aircraft, wherein little room is available therefor.

However, one problem commonly associated with such contemporary laser range finders is that of insufficient power output from the laser transmitter. Insufficient power output is of particular concern, especially when the laser beam must be transmitted through an attenuating medium such as rain, fog, snow, water, dust, etc.

When the laser range finder output beam must be transmitted through such an attenuating medium, it is desirable to increase the output power thereof, so as to compensate for attenuation to both the output beam and the reflected beam.

However, the provision of additional output power is in conflict with the packaging requirements which dictate that the laser transmitters be located proximate the laser receiver, such that a common optical axis is defined therefore and also in order to maintain packaging efficiency.

Prior art attempts to enhance the output power of such laser range finders include the use of optical fibers and polarizing beam combiners. However, the use of such optical elements inherently introduces alignment problems and reduces the overall efficiency of the laser transmitting system. It also undesirably increases the complexity and cost of the system.

As such, it is beneficial to provide a means for increasing the output power of the laser transmitter of a laser range finder or the like, so as to facilitate use thereof in adverse conditions.

SUMMARY OF THE INVENTION

The present invention specifically addresses and alleviates the above-mentioned deficiencies associated with the prior art. More particularly, the present invention comprises a multiplexer for laser range finders and the like. The multiplexer comprises a laser receiver having an optical receiving area and a plurality of separate laser transmitters disposed about a periphery of the laser receiver. Each of the laser transmitters has an optical transmitting area which is substantially less than the optical receiving area of the laser receiver. The optical receiving area of the laser receiver defines the cross-sectional area of the laser beam received thereby and the optical transmitting area of each laser transmitter defines the cross-sectional area of the laser beam radiated thereby. Thus, for generally circular laser transmitters and receivers, the diameter of each of the laser transmitters is substantially less than the diameter of the laser receiver.

The laser receiver and each of the laser transmitters are configured to have a substantially common optical axis such that the individual laser beams transmitted by the laser transmitters substantially overlap at a plane of interest. According to the preferred embodiment of the present invention, the optical receiving area is substantially smaller than the area of such overlap.

The laser receiver preferably has a diameter of approximately 20 cm and each of the laser transmitters preferably has a diameter of approximately 5 cm. Thus, according to the preferred embodiment of the present invention, the laser receiver is surrounded by a maximum of 15 laser transmitters. Each of the laser transmitters preferably comprises a 20 kHz solid state laser.

Thus, according to the present invention, the output power of the laser range finder may be enhanced substantially, so as to facilitate use under adverse conditions such as through fog, rain, snow, water, and/or dust.

In a laser range finder having a laser receiver which is 20 cm in diameter and a plurality of laser transmitters which are 5 cm in diameter, each of the laser transmitters' optical axis is displaced from the receiver's optical axis by 12.5 cm, which is the sum of the radius of the laser receiver and a laser transmitter.

At a plane of interest wherein each of the laser transmitters forms spots having diameters of 2 m, the centers of such spots are thus a maximum of 25 cm from one another and are overlapped. The overlapping of such spots from two parallel laser beams having a diameter d, which are separated by a distance $\delta$ is given by:

$$f_{overlap} = ((2/\pi)\cos^{-1}(\delta/d)) - (2\delta/\pi d)(1-\delta^2/d^2)^{0.5}$$

For this particular example, $f_{overlap}$ is 84.1%. Thus, when four laser transmitters are multiplexed in this fashion, the total laser power transmitted is increased by a factor of 4. The loss of laser power represented by the non-overlapping areas of the spots at the plane of interest is approximately 16% for each laser transmitter. Thus, the increase in laser average power is 0.84 n, where n is the number of identical laser transmitters multiplexed. For a laser receiver having a diameter of 20 cm and laser transmitters having diameters of 5 cm, the maximum number of lasers which can be so multiplexed about the periphery of the laser receiver is 15, and the maximum possible average power enhancement is thus a factor of 12.6. This is indeed substantial since it provides sufficient transmitted laser power to facilitate use of a range finder in adverse conditions such as fog, rain, snow, water, and/or dust.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENTS

The detailed description set forth below in connection with the appended drawings is intended as a description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
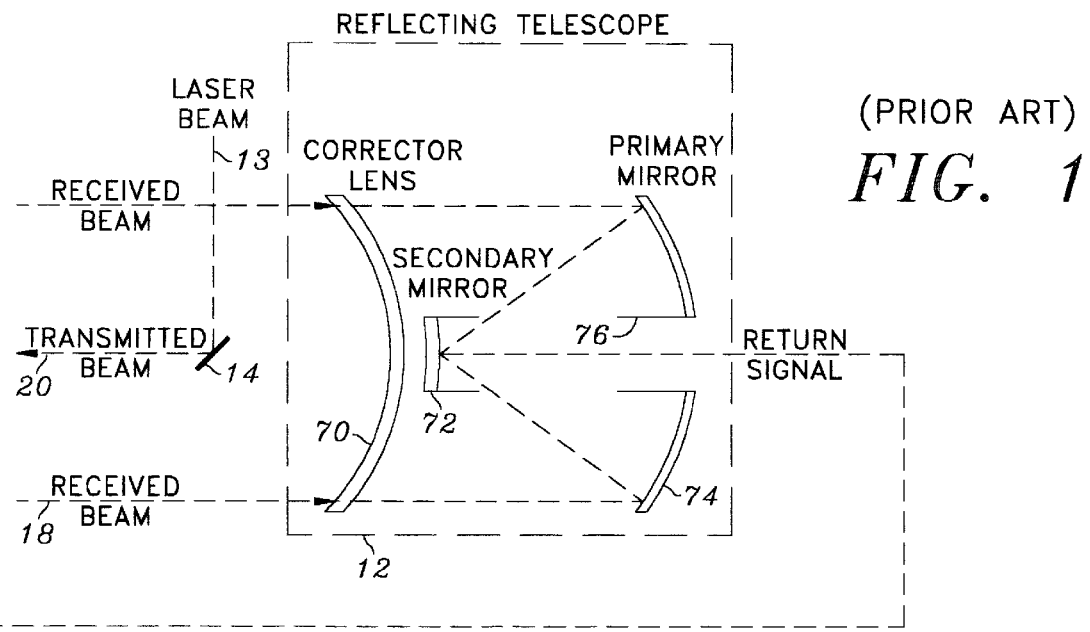
FIG. 1 is a schematic illustration of a prior art laser range finder, wherein the laser transmitter is coaxially located with the laser receiver, so as to facilitate enhanced accuracy and efficient packaging thereof.
Figure 1:
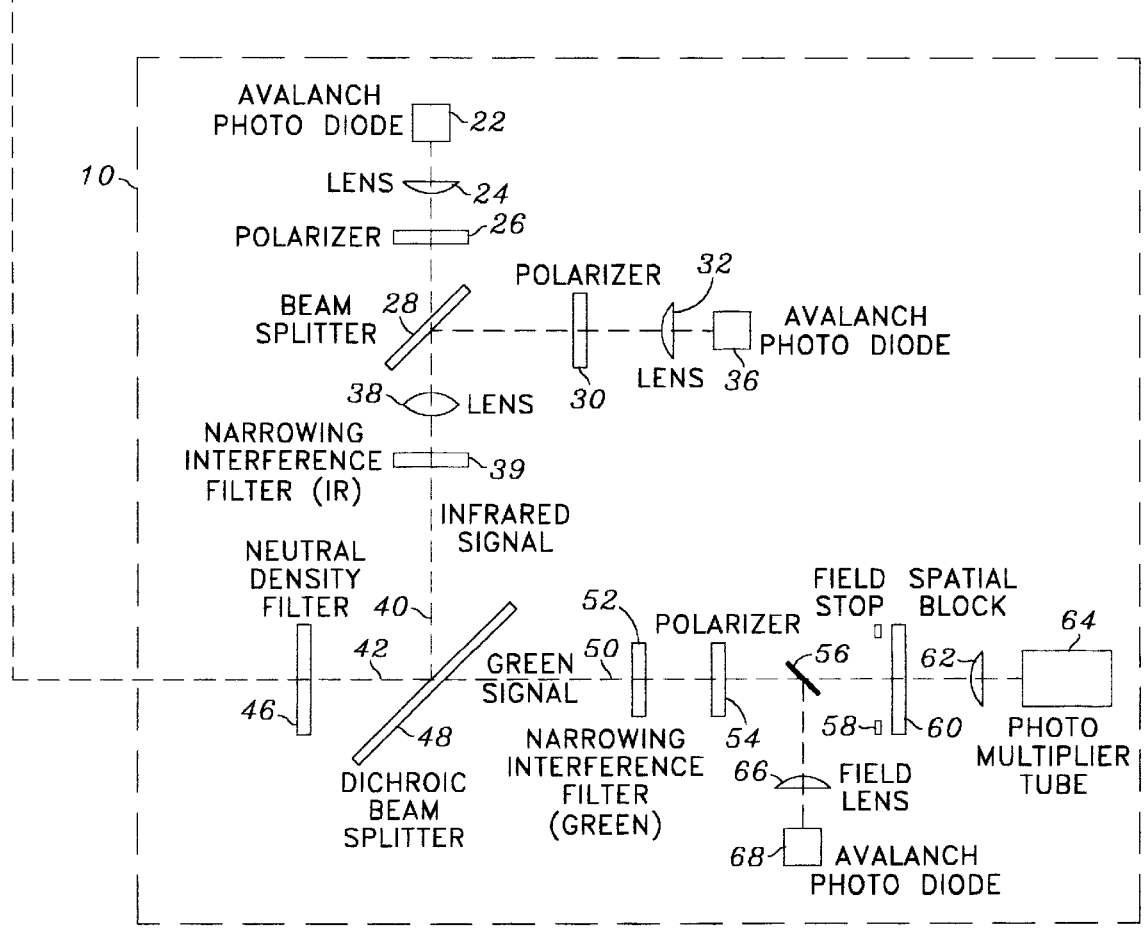
Figure 2:
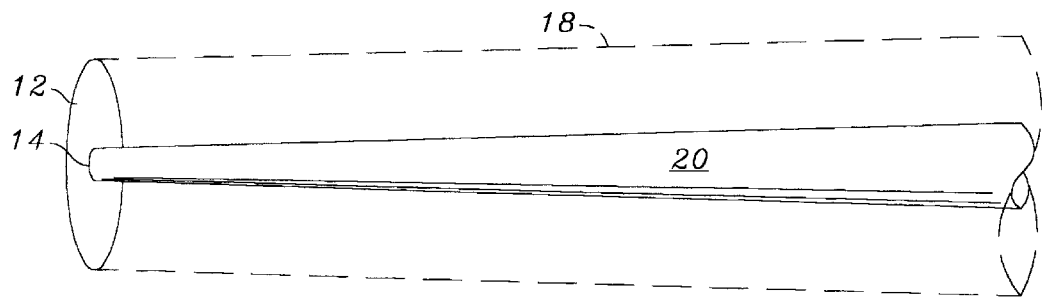
FIG. 2 is a schematic representation of the transmitted and received laser beams according to the prior art.
Figure 4:
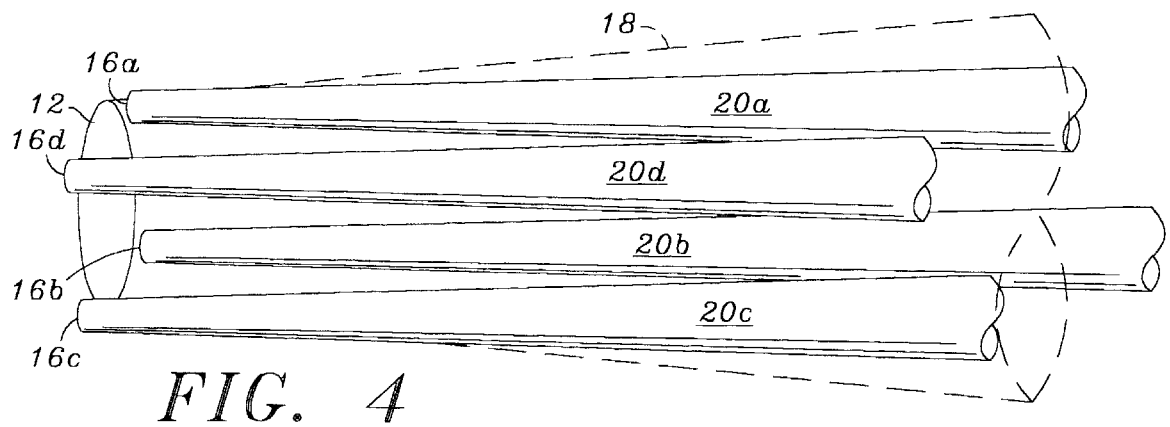
FIG. 4 is a schematic representation of the transmitted and received laser beams according to the present invention, showing the individual transmitted beams expanding so as to overlap one another and also so as to overlap the returned beam to the receiver, thus substantially providing a common axis therefor.
Figure 3:
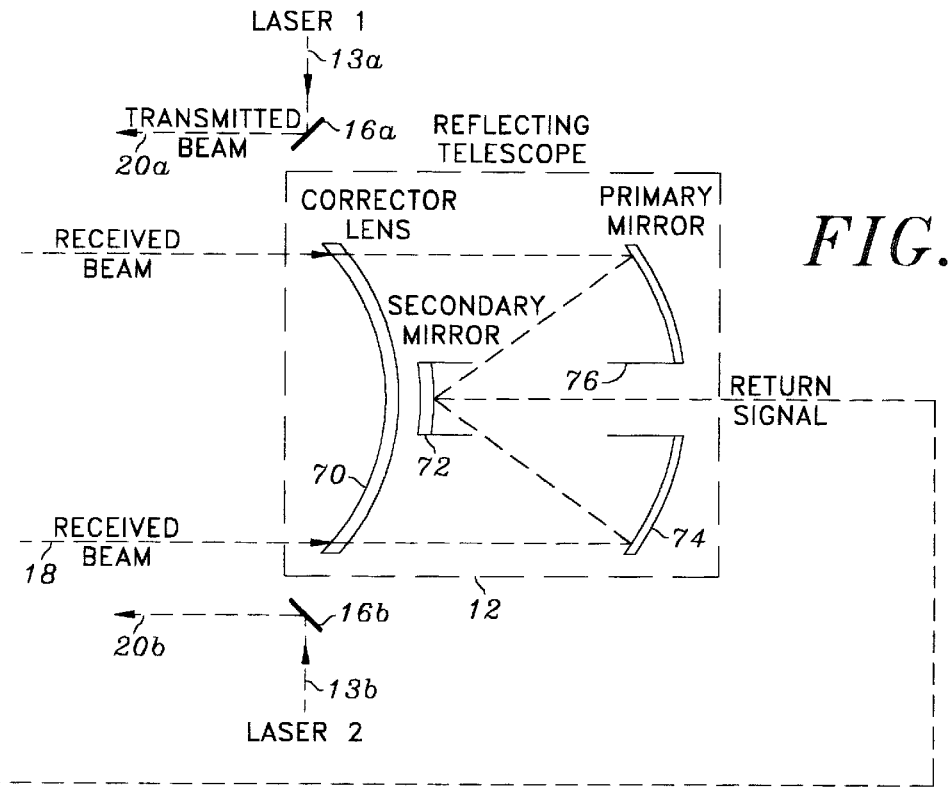
FIG. 3 is a schematic illustration of the multiplexer for ranging devices and the like of the present invention, wherein a plurality of laser transmitters are located about the periphery of the laser receiver, in a manner which substantially provides a common optical axis for the laser transmitters and the laser receiver so as to maintain accuracy and which also facilitates efficient packaging thereof.
Figure 3:
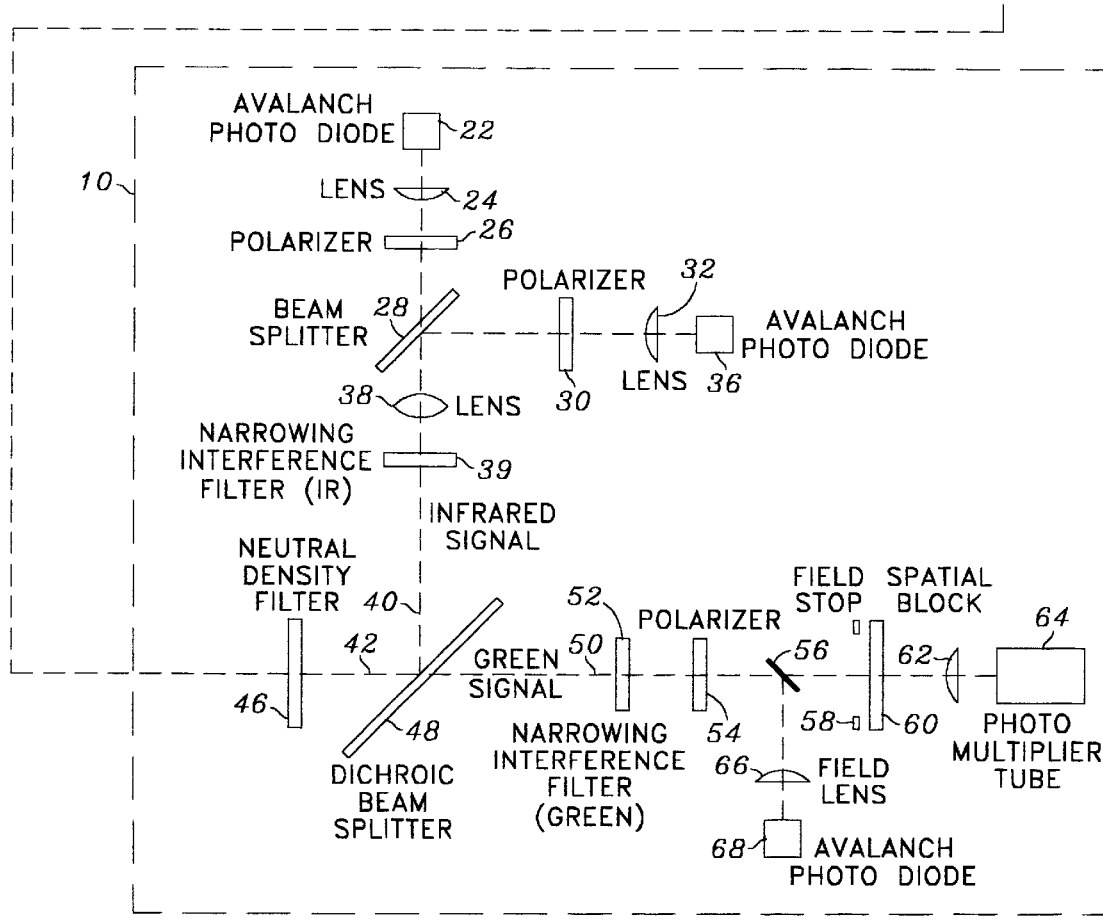
Figure 5:
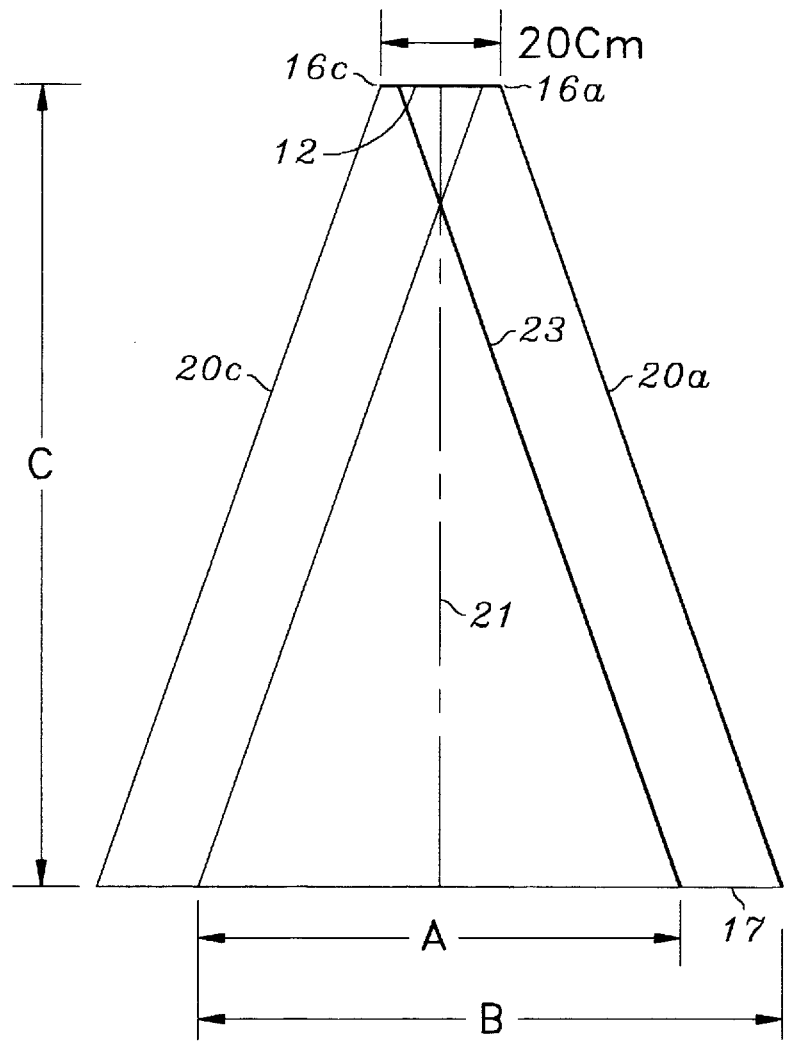
FIG. 5 is a diagram showing the geometry of the overlapping transmitted laser beams and also showing the substantially common optical axis for the laser transmitters and the laser receiver.

The multiplexer for laser range finders and the like of the present invention is illustrated in FIGS. 3–5. FIGS. 1 and 2 show a prior art laser range finder.

Referring now to FIG. 1, a contemporary laser range finder comprises received beam optics 10, reflecting telescope or laser receiver 12, and a co-axially mounted laser transmitter 14.

More particularly, the received beam optics 10 comprises a neutral density filter 46 through which the returned laser beam 42 is received. The returned beam 42 is then split via dichroic beam splitter 48 into an infrared signal 40 and a green signal 50. The infrared signal 40 is transmitted through a narrowing interference infrared filter 39 and focused via lens 38 upon beam splitter 28. The reflected infrared beam from beam splitter 28 passes through a polarizer 30 and is focused by lens 32 onto the avalanche photodiode 36. That portion of the infrared beam transmitted through beam splitter 28 is transmitted to polarizer 26 and focused via lens 24 onto the avalanche photodiode 22.

The green signal 50 transmitted through dichroic beam splitter 48 is transmitted to narrow band interference green filter 52 and polarizer 54. The green signal 50 is then transmitted to beam splitter 56. That portion of the green signal reflected from beam splitter 56 is transmitted to field lens 66 which focuses the green signal upon avalanche photodiode 68. That portion of the green signal transmitted through the beam splitter 56 is transmitted to field stop 58 and spatial block 60 and then focused via field lens 62 upon the photomultiplexer 64.

Thus, the received beam optics 10 of the laser range finder of the prior art operates according to well known principles to determine the distance to a remote object via analysis of the return signal captured by the reflecting telescope or laser receiver 12.

The laser receiver 12 comprises a correction lens 70 which focuses the return laser beam upon primary mirror 74 which reflects the return laser beam to secondary mirror 72, from which the return laser beam is transmitted to the return laser beam optics 10.

A laser beam 13 is reflected via mirror or laser transmitter 14 to form transmitted laser beam 20 which is transmitted to the remote object to facilitate ranging thereof. According to the prior art, the laser transmitter 14 is disposed coaxially with respect to the laser receivers 12, thereby enhancing the accuracy of the range measurements determined therewith and also providing a more efficient packaging therefor.

Referring now to FIG. 2, the transmitted laser beam 20 is thus coaxially radiated by the laser transmitter 14 with respect to the received laser beam 18 which is received by the laser receiver 12. In this manner, the transmitted laser beam 20 and the received laser beam 18 share a common optical axis 21.

As those skilled in the art will appreciate, such configuration inherently limits the transmitted laser power to that of transmitted laser beam 20. When range finding is performed under adverse conditions such as fog, rain, snow, water, and/or dust, it is desirable to increase the power of the transmitted laser beam 20 substantially, so as to compensate for the attenuation which occurs thereto under such adverse conditions.

Referring now to FIG. 3, the present invention comprises laser receiving optics 10 and reflecting telescope or laser receiver 12, which preferably substantially are the same as those of the prior art. However, rather than a single coaxially located laser transmitter, as in the prior art, the present invention comprises a plurality of separate laser transmitters 16a, 16b which facilitate enhanced output power such that the present invention may be utilized under adverse conditions such as fog, rain, snow, water, and/or dust.

Thus, the separate laser transmitters 16a, 16b receive separate laser beams 13a, 13b, so as to form separate transmitted laser beams 20a, 20b, respectively. As those skilled in the art will appreciate, the number of separate transmitted laser beams 20a, 20b, etc. is limited only by the size of the transmitters or mirrors 16a, 16b, etc. with respect to the size of the receiver 70. Thus, the smaller the size of the transmitters 16a, 16b, etc. with respect to the size of the receiver 70, the more transmitters 16a, 16b, etc. that may be disposed thereabout. In this manner, a plurality of different lasers may be utilized in a simple, inexpensive, and easy to maintain manner so as to provide enhanced output power. Since the separate laser beams are being multiplexed via the transmitters 16a, 16b, no other optical components need to be provided and/or aligned. Thus, the multiplexer of the present invention facilitates such enhanced output power in a cost effective manner which does not undesirably decrease the packaging efficiency thereof.

Referring now to FIG. 4, the laser transmitters 16a, 16b, 16c, 16d, are shown disposed about the periphery of laser receiver 12. Transmitted laser beams 20a, 20b, 20c, 20d radiate outwardly from the laser transmitters 16a, 16b, 16c, 16d and ultimately, due to the divergence thereof, combine to form a single, overlapping spot at the plane of interest 17 (as shown in FIG. 5). Thus, at a sufficient distance from the laser transmitters 16a, 16b, 16c, 16d and the laser receiver 12, the four transmitted laser beams 20a, 20b, 20c, 20d combine so as to be substantially coaxial with the received laser beam 18, particularly at the plane of interest 17.

Referring now to FIG. 5, two laser transmitters 16a and 16c are shown diagonally opposed to one another with respect to laser receiver 12. The transmitted laser beam 20a from mirror or laser transmitter 16a overlaps with the transmitted laser beam 20c from mirror or laser transmitter 16c such that at the plane of interest 17 each individual beam spot, dimension B, formed upon the plane of interest 17 via individual transmitted laser beams 20a, 20c combines to form overlap, dimension A, at the plane of interest 17. The size of the overlap, dimension A, is dependent upon the divergence of the transmitted laser beams 20a, 20c, the distance between the laser transmitters 16a and 16c, and the distance to the plane of interest, dimension C.

The cone of overlap 23 formed by the overlapping transmitted laser beams 20a, 20c as they propagate toward the plane of interest 17 shares a substantially common optical axis 21 with that of the laser receiver 12.

In a laser range finder having a laser receiver which is 20 cm in diameter and a plurality of laser transmitters which are 5 cm in diameter, each of the laser transmitters' optical axis is displaced from the receiver's optical axis by 12.5 cm, which is the sum of the radius of the laser receiver and the radius of a laser transmitter.

At a plane of interest wherein each of the laser transmitters forms a spot having a diameter of 2 m, the centers of such spots are thus a maximum of 25 cm from one another and are overlapped. The overlapping of such spots from two parallel laser beams having a diameter d, which are separated by a distance δ is given by:

$$f_{overlap} = ((2/\pi)\cos^{-1}(\delta/d)) - (2\delta/\pi d)(1-\delta^2/d^2)^{0.5}$$

For this particular example, $f_{overlap}$ is 84.1%. Thus, when four laser transmitters are multiplexed in this fashion, the total laser power transmitted is increased by a factor of 4. The loss of laser power represented by the non-overlapping areas of the spots at the plane of interest is approximately 16% for each laser transmitter. Thus, the increase in laser average power is 0.84 n, where n is the number of identical laser transmitters multiplexed. For a laser receiver having a diameter of 20 cm and laser transmitters having diameters of 5 cm, the maximum number of lasers which can be so multiplexed about the periphery of the laser transmitter is 15, and the maximum possible average power enhancement is thus a factor of 12.6. This is indeed substantial since it provides sufficient transmitted laser power to facilitate use of a range finder in adverse conditions such as fog, rain, snow, water, and/or dust.

It is understood that the exemplary multiplexer for ranging devices and the like described herein and shown in the drawings represents only a presently preferred embodiment of the invention. Indeed, various modifications and additions may be made to such embodiment without departing from the spirit and scope of the invention. For example, the laser transmitters, typically mirrors, and the laser receiver may be of any desired shape or configuration. Further, the laser transmitters may alternatively comprise laser generating devices, e.g., laser diodes, rather than mirrors which reflect the laser output of a device which is not itself necessarily located about the periphery of the laser receiver. Thus, these and other modifications and additions may be obvious to those skilled in the art and may be implemented to adapt the present invention for use in a variety of different applications.

What is claimed is:

1. A multiplexer for laser range finders and the like, the multiplexer comprising:

a) a laser receiver having an optical receiving area and an optical axis; and b) a plurality of laser transmitters disposed about a periphery of the laser receiver, each of said laser transmitters having an optical transmitting area, the optical transmitting area of each of the laser transmitters being substantially less than the optical receiving area of the laser receiver, each of the laser transmitters having an optical axis which is displaced from the laser receiver's optical axis by a distance which is equal to a sum of a radius of the laser receiver and a radius of the laser transmitter;

c) wherein the laser receiver and each of the laser transmitters are configured to have a substantially common optical axis such that laser beams transmitted by the laser transmitters substantially overlap at a plane of interest.

2. The multiplexer as recited in claim 1 wherein:

a) the laser receiver is generally circular in configuration and has a diameter of approximately 20 cm; and b) each of the laser transmitters is generally circular in configuration and has a diameter of approximately 5 cm.

3. The multiplexer as recited in claim 1 wherein the plurality of laser transmitters comprises 15 laser transmitters.

4. The multiplexer as recited in claim 1 wherein each of the laser transmitters comprises a 20 kHz pulse frequency solid state laser.

5. A method for multiplexing a plurality of lasers for use in range finders and the like, the method comprising the steps of:

a) receiving laser radiation via a laser receiver having an optical receiving area and an optical axis; and b) transmitting laser radiation via a plurality of laser transmitters disposed about a periphery of the laser receiver, each of the laser transmitters having an optical transmitting area substantially less than that of the optical receiving area of the laser receiver, each of the laser transmitters having an optical axis which is displaced from the laser receiver's optical axis by a distance which is equal to a sum of a radius of the laser receiver and a radius of the laser transmitter;

c) wherein the laser receiver and the laser transmitters receive and transmit, respectively, along a substantially common optical axis and the laser transmitters substantially overlap at a plane of interest.

6. The method as recited in claim 5 wherein:

a) the step of receiving laser radiation comprises receiving laser radiation via a laser receiver which is generally circular in configuration and which has a diameter of approximately 20 cm; and b) the step of transmitting laser radiation comprises transmitting laser radiation via a laser transmitter which is generally circular in configuration and has a diameter of approximately 5 cm.

7. The method as recited in claim 5 wherein the step of transmitting laser radiation comprises transmitting laser radiation via 15 laser transmitters.

8. The method as recited in claim 5 wherein the step of transmitting laser radiation comprises transmitting laser radiation via a plurality of 20 kHz pulse frequency solid state lasers.

* * * * *